US011941049B2

(12) United States Patent
Jindal et al.

(10) Patent No.: US 11,941,049 B2
(45) Date of Patent: Mar. 26, 2024

(54) ADAPTIVE SEARCH RESULTS FOR MULTIMEDIA SEARCH QUERIES

(71) Applicant: Adobe Inc., San Jose, CA (US)

(72) Inventors: Amol Jindal, Punjab (IN); Subham Gupta, Uttarakhand (IN); Poonam Bhalla, New Delhi (IN); Krishna Singh Karki, New Delhi (IN); Ajay Bedi, Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/902,457

(22) Filed: Sep. 2, 2022

(65) Prior Publication Data

US 2022/0414149 A1 Dec. 29, 2022

Related U.S. Application Data

(63) Continuation of application No. 16/591,847, filed on Oct. 3, 2019, now Pat. No. 11,500,927.

(51) Int. Cl.
*G06F 16/738* (2019.01)
*G06F 16/732* (2019.01)
(Continued)

(52) U.S. Cl.
CPC ........ *G06F 16/738* (2019.01); *G06F 16/7328* (2019.01); *G06F 16/735* (2019.01);
(Continued)

(58) Field of Classification Search
CPC .. G06F 16/738; G06F 16/7328; G06F 16/735; G06F 16/783; G06F 16/7837; G06F 16/7867; G06F 16/70
See application file for complete search history.

(56) References Cited

U.S. PATENT DOCUMENTS 7,016,540 B1 * 3/2006 Gong .................... G06F 16/785
348/703
2003/0152363 A1 8/2003 Jeannin et al.
(Continued)

OTHER PUBLICATIONS

"Aesthetics", Aesthetics at Sensei's Library, Available Online at: https://senseis.xmp.net/?Aesthetics, Sep. 25, 2018, 2 pages.
(Continued)

*Primary Examiner* — Sanchita Roy
(74) *Attorney, Agent, or Firm* — Kilpatrick Townsend & Stockton LLP

(57) ABSTRACT

A system identifies a video comprising frames associated with content tags. The system detects features for each frame of the video. The system identifies, based on the detected features, scenes of the video. The system determines, for each frame for each scene, a frame score that indicates a number of content tags that match the other frames within the scene. The system selects, for each scene, a set of key frames that represent the scene based on the determined frame scores. The system receives a search query comprising a keyword. The system generates, for display, search results responsive to the search query including a dynamic preview of the video. The dynamic preview comprises an arrangement of frames of the video corresponding to each scene of the video. Each of the arrangement of frames is selected from the selected set of key frames representing the respective scene of the video.

19 Claims, 9 Drawing Sheets

(51) Int. Cl.
  *G06F 16/735* (2019.01)
  *G06F 16/78* (2019.01)
  *G06F 16/783* (2019.01)

(52) U.S. Cl.
  CPC ........ *G06F 16/783* (2019.01); *G06F 16/7837* (2019.01); *G06F 16/7867* (2019.01)

(56) References Cited

U.S. PATENT DOCUMENTS

| | | |
|---|---|---|
| 2011/0047163 A1 | 2/2011 | Chechik et al. |
| 2016/0070962 A1 | 3/2016 | Shetty et al. |
| 2018/0084023 A1 | 3/2018 | Stoop et al. |
| 2018/0089203 A1 | 3/2018 | Soni et al. |

OTHER PUBLICATIONS

U.S. Appl. No. 16/591,847, "First Action Interview Office Action Summary", dated Mar. 7, 2022, 6 pages.

U.S. Appl. No. 16/591,847, "First Action Interview Pilot Program Pre-Interview Communication", dated Dec. 24, 2021, 5 pages.

U.S. Appl. No. 16/591,847, "Notice of Allowance", dated Jun. 28, 2022, 13 pages.

Liao et al., "YouTube Thumbnails Now Look Like GIFs", The Verge, Available Online at: https://www.theverge.com/2017/7/14/15973058/youtube-gif-thumbnails-videopreviews-why-is-it-moving, Jul. 14, 2017, 2 pages.

Mejia, "Needle In a Haystack No More: Data Science, DMPs, and Finding Your Next Great Customer Now", Digital Transformation, Available Online at: https://blog.adobe.com/en/2019/07/02/needle-in-a-haystack-no-more-data-sciencedmps-and-finding-your-next-great-customer-now.html#gs.gfuf6x, Jul. 2, 2019, 5 pages.

Yang et al., "Improving YouTube Video Thumbnails with Deep Neural Nets", Google AI Blog, Available Online at: https://ai.googleblog.com/2015/10/improvingyoutube-video-thumbnails-with.html, Oct. 8, 2015, 4 pages.

\* cited by examiner

ADAPTIVE SEARCH RESULTS FOR MULTIMEDIA SEARCH QUERIES

CROSS-REFERENCE TO RELATED APPLICATIONS

This application is a continuation application of U.S. application Ser. No. 16/591,847, filed Oct. 3, 2019, now allowed, which is incorporated herein by reference in its entirety.

TECHNICAL FIELD

This disclosure generally relates to image processing. More specifically, but not by way of limitation, this disclosure relates to generating adaptive search results for multimedia search queries.

BACKGROUND

Image processing systems are used for creating appealing images that are displayed with online services that provide digital forums in which end users may interact with online content (e.g., by browsing multimedia content, purchasing multimedia content, commenting on multimedia content, sharing multimedia content, etc.). Image processing systems use modeling algorithms that involve techniques such as content filtering, pattern recognition, semantic relationship identification, user profiling, etc. These image processing algorithms enable users to search for and locate desirable multimedia content related to various content categories of interest.

SUMMARY

The present disclosure includes generating adaptive search results for multimedia search queries of keywords related to multimedia content. In one example, a computing system identifies a video comprising frames, the frames associated with content tags. The computing system detects features for each frame of the video. The computing system identifies, based on the detected features, scenes of the video. The computing system determines, for each frame for each scene, a frame score that indicates a number of content tags that match the other frames within the scene. The computing system selects, for each scene, a set of key frames that represent the scene based on the determined frame scores. The computing system receives a search query comprising a keyword. The computing system generates, for display, search results responsive to the search query, the search results including a dynamic preview of the video. The dynamic preview comprises an arrangement of frames of the video corresponding to each scene of the video. Each of the arrangement of frames is selected from the selected set of key frames representing the respective scene of the video.

These illustrative examples are mentioned not to limit or define the disclosure, but to aid understanding thereof. Additional embodiments and examples are discussed in the Detailed Description.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
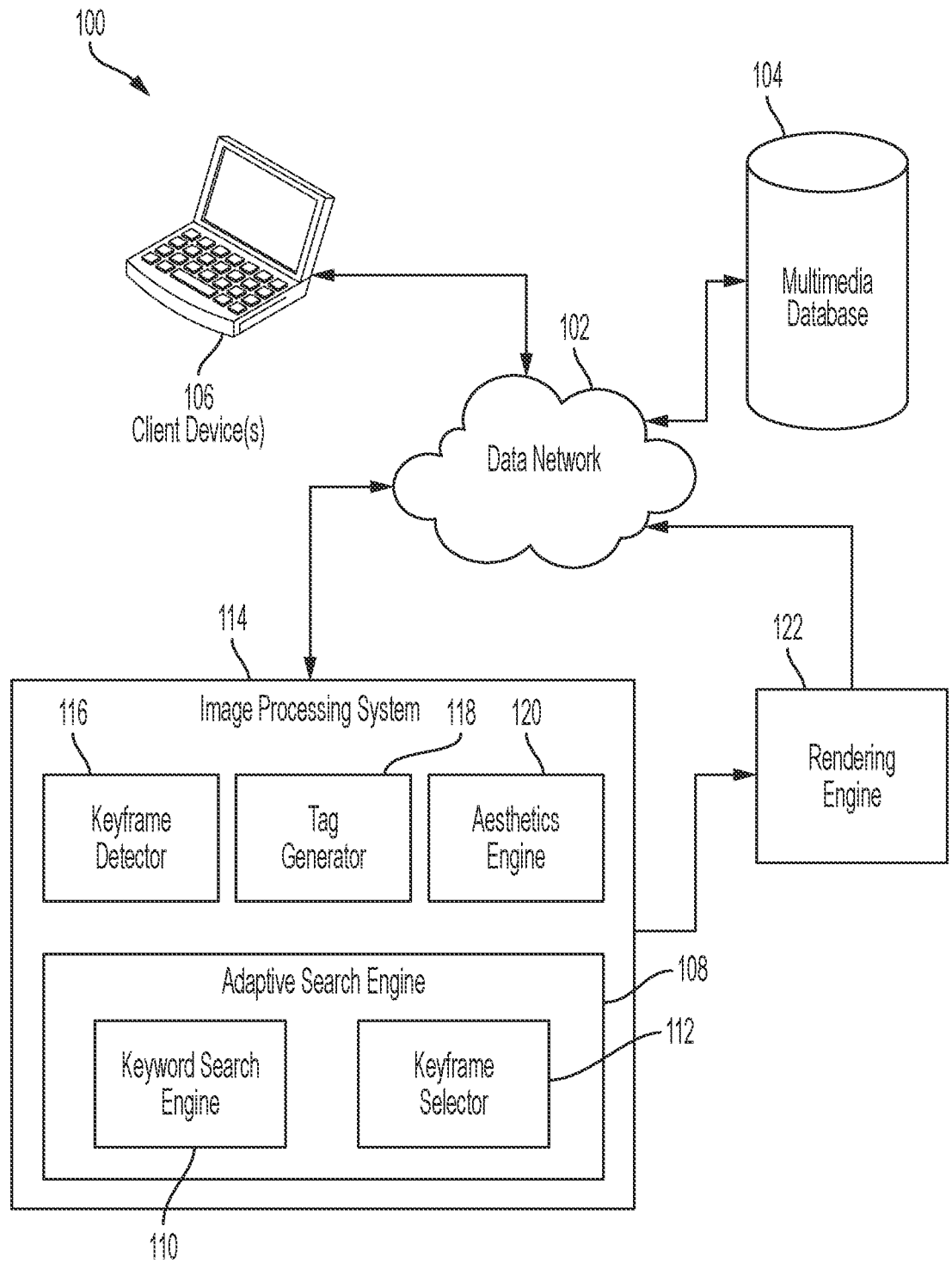
FIG. 1 depicts an example of a computing environment for generating adaptive search results for multimedia search queries, according to certain embodiments of the present disclosure.

The present disclosure includes generating adaptive search results for multimedia search queries of keywords related to multimedia content. For instance, embodiments described herein can generate dynamic previews, such as collages or preview videos, using video frames that more closely match a search query than other video frames. For instance, if a video included in a set of search results for the query "monkey" has a frame with a "monkey" tag and a frame with a "building" tag, the dynamic preview can include the frame with the "monkey" tag. In this manner, the dynamic preview can more quickly indicate to a user that the video is relevant to the search query.

The following non-limiting example is provided to introduce certain embodiments. In this example, an image processing system receives a search query for a set of videos, such as a search query that contains the keyword "monkey." The image processing system can identify a set of search results, such as videos with content tags or other data with the term "monkey." Examples of these content tags include a title tag (e.g., a video titled "Monkey on Typewriter"), a summary tag (e.g., a video with the summary "Monkey rides a bike to the store"), etc. The image processing system can generate dynamic previews of these search results, where the dynamic preview includes a set of keyframes from a video search result that depicts content that is relevant to the search result.

For instance, a video file included in the search results could include keyframes that are related to the search query. The image processing system can compute, for each keyframe, a respective matching score. A matching score for a keyframe indicates a number of matches between content tags for the keyframe and a keyword set in the search query. Examples of search terms that could be included in a keyword set include one or more of a keyword specified by a user, a synonym of a user-specified keyword, a root word of a user-specified keyword (e.g., the root word "ride" for the user-specified word "riding"), an umbrella term encompassing a user-specified keyword (e.g., umbrella terms such as "primate" or "mammal" for the user-specified term "monkey"), a category associated with a user-specified keyword (e.g., categories including "funny monkey videos," "cute baby monkeys," or "monkey dancing video clips" for the user-specified term "monkey"), a semantically-related word or phrase for a user-specified keyword (e.g., semantically words or phrases such as "primate," "ape," "chimpanzee," "chimp," "species of great apes," "new world monkeys," or "old world monkeys" for the user-specified term "monkey"), etc.

Returning to the simplified example above, a video with the summary "Monkey rides a bike to the store" could include frames depicting the store (but not a monkey) and frames depicting a monkey riding a bike. A first set of frames depicting the monkey can include a content tag such as "monkey," and a second set of frames depicting the store can include a content tag such as "store." A keyframe with the "monkey" content tag in the first set could have a higher matching score than a keyframe in with the "store" tag in the second set. The image processing system can select the keyframes having higher matching scores (e.g., the top n matching scores, matching scores above a threshold score, etc.) to include in a dynamic preview.

Continuing with this example, the image processing system can generate a dynamic preview for the video. One example of a dynamic preview is an arrangement of the selected keyframes as a collage. Another example of a dynamic preview is an arrangement of selected keyframes that is presented sequentially as a preview video clip, which can be automatically played back. Because selected keyframes have higher matching scores, with respect to terms in the search query, the resulting dynamic preview includes visual content that quickly conveys relevance to a user viewing the search result. For instance, in the example above, a dynamic preview generated for a search query "monkey" includes sequential keyframes depicting a monkey riding a bicycle, rather than keyframes depicting a store without the monkey.

Certain embodiments provide improvements to computing systems used for searching image content by automatically applying various rules of a particular type. For instance, existing techniques for searching for multimedia-related products or services may present disadvantages. Current multimedia and image querying techniques may be able to present images of multimedia items related to search terms. But even if a video includes metadata matching a search term (e.g., the summary "monkey goes to the store" matching the search term "monkey"), a representative image for the video (e.g., a movie poster) may not depict the content within the video (e.g., the monkey) that is relevant to the search term. Presenting such a search result to a user may cause the user to mistakenly disregard the search result as irrelevant. Thus, existing search techniques involving video content can inconvenience a user by spending additional time to determine whether a search result is relevant to the user's search query, or in some cases, incorrectly discarding an otherwise relevant search result.

These problems can be addressed by features described herein. For instance, dynamic previews generated using an image processing system can include image content that is specific to a search query. This image content includes keyframes that are selected based on the keyframes themselves (rather than just a video as a whole) having content tags that match a search query. These features can allow users to determine whether a resulting video search result is relevant to their search query. Thus, embodiments described herein improve computer-implemented processes for querying image content, thereby providing a more suitable solution for automating tasks previously performed by humans.

Example of a Computing Environment for Generating Adaptive Search Results for Multimedia Search Queries Referring now to the drawings, FIG. 1 depicts an example of a computing environment 100 for generating adaptive search results for multimedia search queries, according to certain embodiments of the present disclosure. In the example depicted in FIG. 1, various client devices 106 access an image processing system 114 via a data network 102. The image processing system 114 can include a keyframe detector 116, tag generator 118, aesthetics engine 120, and an adaptive search engine 108. The adaptive search engine 108 can include a keyword search engine 110 and a keyframe selector 112. In some embodiments, the image processing system 114 can be a single computing system that executes a keyframe detector 116, a tag generator 118, an aesthetics engine 120, a keyword search engine 110 and a keyframe selector 112. For instance, a client device 106 that logs into a single website or other online service could obtain access to the functions of these various engines, where one or more server systems (e.g., in a cloud computing environment) execute different engines. In additional or alternative embodiments, a keyframe detector 116, a tag generator 118, an aesthetics engine 120, a keyword search engine 110 and a keyframe selector 112 could be implemented in separate, independently operated computing systems.

In some embodiments, the image processing system 114 is used to detect keyframes, generate content tags for keyframes, and use the content tags to service search queries for video content. For instance, the image processing system 114 is used to obtain, detect, and identify features associated with one or more frames in a video file, where each frame is an image from the sequence of images in the video file. The image processing system 114 can include one or more processing devices for executing suitable program code for performing one or more functions. Examples of this program code include the software engines depicted in FIG. 1, such as keyframe detector 116, tag generator 118, and aesthetics engine 120. Image processing system 114 can use one or more of these engines to determine content tags for video content, select keyframes of the video content having content tags that match at least one keyword from a search query, and provide the selected keyframes to a rendering engine 122. The rendering engine 122 can generate a dynamic preview from the selected keyframes.

Some embodiments of the computing environment 100 include client devices 106. For instance, the client devices 106 may be operated by client entities (e.g., service providers, application developers, or other content providers) requesting augmentation or management of existing images and video files to be augmented with techniques discussed herein. Such requests can be performed by sending video files directly to the adaptive search engine 108 or by requesting retrieval of video files from multimedia database 104. In another example, the client devices 106 may be operated by end users that desire to view an image of an empty container filled with virtual elements. For instance, end users operating client devices may request retrieval of one or more real images or one or more video files from a multimedia database 104, an adaptive search engine 108, a rendering engine 122, or any combination of these.

Examples of a client device 106 include, but are not limited to, a personal computer, a tablet, a desktop, a server, a mobile device, a smartphone, a processing unit, any combination of these devices, or any other suitable device having one or more processors. A user of a client device 106 uses various products, applications, or services supported by the adaptive search engine 108 via the data network 102.

Each of the client devices 106 are communicatively coupled to the adaptive search engine 108 via the data network 102. Examples of the data network 102 include, but are not limited to, internet, local area network ("LAN"), wireless area network, wired area network, wide area network, and the like.

Examples of Operations for Keyword Searching

The adaptive search engine 108 can be used to search for video files that match a keyword set included in a search query from a client device 106. For instance, as described in detail with respect to the various examples below, the adaptive search engine 108 can include code, such as a keyword search engine 110, that is executed to service a query for one or more video files matching one or more search terms, i.e., a set of keywords included in a search query received from a client device. The adaptive search engine 108 can service a query by finding video content that matches the query and providing, in response to the query, a dynamic preview generated from the video content.

In an illustrative example, the keyword search engine 110 retrieves video files having content tags that match at least one keyword from a keyword set. The keyword set can include one or more keywords in a search query received from a client device 106. In some embodiments, the keyword set can also include variants of one or more keywords included in a user's search query. Examples of a variant of a keyword include a synonym of the keyword, a synonymous word or phrase for a phrase having two or more keywords, a root word of a keyword (e.g., "search" instead of "searching"), etc.

In the example depicted in FIG. 1, the adaptive search engine 108 executes the keyword search engine 110 to obtain relevant video content related to a keyword set from a search query. For instance, the keyword search engine 110 determines that content tags or other metadata of a video matches at least some of the keyword set from a search query. The keyword search engine 110 provides the keyframe selector 112 with access to the video content (e.g., one or more video files).

The keyframe selector 112 identifies keyframes from the video content that has been identified by the keyword search engine 110 as matching a keyword set from a search query. To do so, the keyframe selector 112 can compute matching scores for each of the identified keyframes. A matching score for a given keyframe indicates a number of matches between the keyword set and content tags associated the keyframe. As a simplified example, a search query could include the words "monkey" and "sun," a keyword set could include the synonyms "primate" and "daytime," and a keyframe depicting a jungle scene could be associated with a first content tag identifying a feature in the keyframe as a "primate" and a second content tag identifying a feature in the keyframe as "daytime." A feature could include a set of repetitive low-level image components (e.g., pixel values, edges, corners, blobs, ridges, or changes in curvature, intensity, or spatial location). Additionally or alternatively, a feature could include a set of higher-level image components (e.g., candidate objects, multi-scale features, spatial relationships, semantic relationships, three-dimensional movement, etc.). In this example, the keyframe could have a matching score indicating two matches between content tags of the keyframe and the keyword set (i.e., the match on "daytime" and the match on "primate").

In some embodiments, the keyframe selector 112 determines a ranking of these received keyframes. The keyframe selector 112 can rank the keyframes for a given video file by sorting the matching scores according to a number of matches between the keyword set and the content tags in the keyframes to create a keyframe set. In one example, the keyframe selector 112 could determine, from the matching scores, that a first keyframe of a video file has a first number of matches between the keyword set and content tags associated with the first keyframe, and could further determine that a second keyframe of a video file has a second number of matches between the keyword set and content tags associated with the second keyframe. The keyframe selector 112 could rank the first keyframe higher than the second keyframe if the first number of matches is greater than the second number of matches.

In another example, the keyframe selector 112 could determine that a first keyframe of a video file has a first normalized matching score, and could further determine that a second keyframe of a video file has a second normalized matching score. A normalized matching score could be computed by multiplying a set of numerical matching scores, for a given keyframe set, by a factor to create a common scale that is easily sorted according to their adjusted values. In one example, a range of normalized matching scores from 0 (for the lowest n number of matches) to 1 (for the highest n number of matches) could be used for scoring the number of matches for all of the keyframes in a keyframe set. For instance, a normalized score for a first keyframe could be computed as the number of matches for the keyframe divided by the number of features detected in the keyframe. In a simplified example, excluding detected features that are common to the keyframe set, a keyframe with three additional detected features that are common to two matches (i.e., two features of a highest amount of three additional detected features matching the keyword set, using the number of matches associated with the keyframe having the highest number of matches in the keyframe set) would use a factor of one-third multiplied by the two additional matches to compute a normalized matching score of 0.67, whereas a second keyframe with five detected features and two matches (i.e., two features of the highest amount, of the keyframe set, of five additional detected features matching the keyword set) would use a factor of one-fifth multiplied by the two matches to compute a normalized matching score of 0.40. The keyframe selector 112 could rank the first keyframe higher than the second keyframe if the first normalized matching score is greater than the second normalized matching score.

In some embodiments, the keyframe selector 112 ranks the keyframes for a given video file using the number of matches between the keyword set and the content tags in the keyframes, as described above, in combination with one or more additional parameters. For instance, a rank for a given keyframe might be a weighted sum of a matching score and one or more additional parameters, where one weight is applied to the matching score, another weight is applied to a first additional parameter, yet another weight is applied to a second additional parameter, etc.

One example of these additional parameters is a set of aesthetic scores computed by the aesthetics engine 120. For instance, in the examples above, considering only match scores might cause a first keyframe to be ranked higher than a second keyframe. But if the keyframe selector 112 determines that the second keyframe has an aesthetic score greater than an aesthetic score of the first keyframe, and the difference between the matching scores of the first and second keyframes is sufficiently small (e.g., below a threshold amount), then the keyframe selector 112 could rank the second keyframe higher than the first keyframe. Another example of an additional parameter is a diversity or uniformity for the selected keyframes. For instance, in the examples above, considering only match scores might cause a first keyframe to be ranked higher than a second keyframe. But if the keyframe selector 112 determines that including the second keyframe will result in greater diversity of semantic content in the dynamic preview and that difference in the matching scores between the first and second keyframes is sufficiently small, the keyframe selector 112 could rank the second keyframe higher than the first keyframe.

The keyframe selector 112 stores a sorted list of the ranked keyframes. The rankings of the keyframes are used to generate a dynamic preview. In some embodiments, the dynamic preview can be a collage. In additional or alternative embodiments, the dynamic preview can be an on-hover preview video that includes a selected set of keyframes. The rendering engine 122 can generate a dynamic preview of adaptive search results depicting at least two keyframes in a particular arrangement. For instance, the rendering engine 122 receives, from an adaptive search engine 108, a set of selected keyframes or information can be used by the rendering engine 122 to retrieve the keyframes (e.g., a location of the video file and timestamps of the selected keyframes).

The rendering engine 122 can combine the selected keyframes into a dynamic preview. Examples of combining the keyframes include blending, layering, overlaying, merging, splicing, or any other suitable visual integration technique. The rendering engine 122 outputs the dynamic preview of adaptive search results to one or more client devices 106. In one example, the rendering engine 122 may blend or layer keyframes in a dynamic preview during a transition in video clip, e.g., combining keyframes by simultaneously increasing a transparency of a displayed first keyframe while decreasing the transparency a fully transparent second keyframe, to provide a smoother visual transition between non-sequential selected keyframes. In another example, the rendering engine 122 can splice keyframes from temporally distinct portions to create a dynamic preview that is a video clip for playback. In some examples, the rendering engine 122 can transcode and merge keyframes with different codecs into a dynamic preview. In another example, the dynamic preview can create a collage by partially or completely overlaying one keyframe with another with any suitable amount of transparency, translucence, or opacity.

For illustrative purposes, FIG. 1 depicts an image processing system 114, a keyframe detector 116, a tag generator 118, an aesthetics engine 120, and an adaptive search engine 108 having a keyword search engine 110 and a keyframe selector 112. But the image processing system 114 and adaptive search engine 108 can include any number of systems, sub-systems, or program code(s) to generate adaptive search results for one or more keywords, which may include one or more search queries. Further, any number or type of adaptive search results may be generated for client devices 106 with the adaptive search engine 108.

Examples of Video-Processing Operations to Facilitate Keyword Searching

The image processing system 114 can perform one or more video-processing operations to facilitate keyword-based search queries for videos. Examples of these operations include detecting keyframes within a video, generating content tags for a video, and assessing aesthetic qualities of different keyframes within a video.

In an illustrative example, the image processing system 114 receives a video file with one or more scenes. The image processing system 114 can execute the keyframe detector 116 to divide the video file into segments by determining one or more keyframes associated with major scenes within the video file. An example of a major scene is a video segment that depict substantially similar features identified within a sequence of images contained within the video file.

The keyframe detector 116 identifies features from video frames using a suitable feature-detection algorithm. Examples of a suitable feature-detection algorithm include a binary robust independent elementary features ("BRIEF") algorithm, an oriented FAST and rotated BRIEF ("ORB") algorithm, and a features from accelerated segment test ("FAST") algorithm. The keyframe detector 116 creates video segments (e.g., temporal segments, topical segments, clustered segments, multi-scale segments, motion segments, chunks, etc.) from the features, where each video segment includes frames with a common set of features and thereby depicts a major scene from the video file. Using these video segments, the keyframe detector 116 can determine a number of features in each frame that match features shared by other frames within the given video segment.

The keyframe detector 116 can compute a frame score for each frame within the video segment. The frame score indicates a number of matches between features of a given frame and features of other frames within a video segment (e.g., a scene depicted by a set of frames). Each frame score is computed from the number of matching features between the frame and other members of the video segment in combination with other qualities of frames (e.g., aesthetic qualities). The keyframe detector 116 sorts the frames in order of their respective frame scores. The keyframe detector 116 can select one or more keyframes associated with a given major scene, a set of frames with frame scores that meet a threshold criteria. For instance, the keyframe detector 116 could select a frame with the highest frame score, a frame having a frame score that exceeds a threshold frame score specified by a user preference, etc.

Another example of a pre-processing operation is generating content tags. For instance, in some embodiments, a video file can have content tags associated with one or more frames prior to the image processing system 114 servicing a search query. For instance, a video file stored in the multimedia database 104 could include content tags that have been applied using computing systems other than the image processing system 114. However, in additional or alternative embodiments, prior to the image processing system 114 servicing a search query, a video file can have insufficient content tags for matching the video file to a search query, even if the video file includes content that would be relevant to the search query. For instance, such a video file can have insufficient content tags if the video file lacks any content tags at all, or the video file can have insufficient content tags if the video file only includes content tags that do not match any term in the search query.

The image processing system 114 can determine such an insufficiency of a video file's content tags. If the image processing system 114 determines that a video file's content tags are insufficient, the image processing system 114 can perform one or more tagging operations. For instance, the keyframe detector 116 can select certain keyframes representing major scenes within the video file and send the selected keyframes to the tag generator 118. In additional or alternative embodiments, the image processing system 114 can determine an insufficiency or absence of content tags in a video file, or a set of video files, before using the keyframe detector 116 to select a keyframe set associated with major scenes. Such a determination would allow the keyframe detector 116 to identify a keyframe set more accurately, with the increased number of content tags available for processing.

The tag generator 118 can generate content tags associated with selected keyframes as a keyframe set. For instance, the tag generator 118 can detect one or more objects present in each of the keyframes. The tag generator 118 generates a content tag for a frame that describes or otherwise indicates on one or more objects detected in the keyframe. For instance, such a content tag could indicate a mapped location of a detected object (or set of objects) depicted in a keyframe. The tag generator 118 transmits, to the adaptive search engine 108, data that identifies or includes the keyframe set and the generated content tags.

The tag generator 118 can perform the object detection described above using one or more suitable deep learning techniques. Examples of suitable deep learning techniques include techniques using a deep neural network, a convolutional neural network, etc. In one example, the tag generator 118 uses a deep residual network (e.g., ResNet-101) trained for deeper image recognition in combination with a search technique that selectively searches particular regions within a frame (e.g., a region convolutional neural network ("R-CNN"), Fast R-CNN, or Faster R-CNN).

In some examples, a Faster R-CNN model can be pre-trained using a predetermined set or subset of images, objects, and classes or categories of images or objects. For instance, the Faster R-CNN model can receive an initial transfer of images imported from an existing database that includes verified content tags. Using these content tags, associated with spatially-located features within the images, the Faster R-CNN model can more quickly and accurately assign content tags to features in images. The combination of the deep residual network and the search technique can expedite detection of objects within keyframes. In some embodiments, the overall processing speed of the image processing system 114 can be increased by limiting objects that may be identified by the tag generator 118 to any number of classes or categories of objects, e.g., an open images dataset.

In some embodiments, the tag generator 118 data that identifies or includes the keyframe set and their respective content tags to the aesthetics engine 120. The aesthetics engine 120 can compute, for each keyframe, a respective aesthetic score from one or more aesthetic parameters. Examples of these aesthetic parameters may include a global quality score, a balancing element, a color harmony, a level of visual interest, a depth of field, a quality of lighting, an amount of motion blur, an object emphasis, an amount of repetition, a rule of thirds (e.g., an image depicting visual aesthetics divided into thirds), an amount of symmetry, or a vivid color. The aesthetics engine 120 computes an aesthetic score for a given keyframe that indicates an amount of each aesthetic parameter.

For instance, the aesthetics engine 120 can use one or more threshold values to evaluate an amount of vivid colors. Specifically, using chrominance data (e.g., an amount of brightness, hues, saturation of hues, etc.) obtained from a sensor (e.g., a vectorscope), the aesthetic engine 120 can determine whether the keyframe contains an amount of chrominance to indicate the keyframe belongs to a particular level of vivid colors. In another example, the aesthetics engine 120 can use pattern recognition and edge detection that indicates an amount of motion blur in a particular keyframe. Similarly to the thresholding of vivid colors, the aesthetics engine 120 can determine a relative motion blur score that is a parameter included in the respective aesthetic score.

In some embodiments, the aesthetics engine 120 can compute an aesthetic score using numerical values that are assigned to various aesthetic parameters. For instance, the aesthetics engine 120 can determine numerical values based on threshold levels for a set of aesthetic parameters. In one example, aesthetics engine 120 can select a set of five parameters (e.g., a global quality score, a quality of lighting, a rule of thirds, an amount of symmetry, and an amount of vivid colors), each having an aesthetic score that is an assigned numerical value between zero (e.g., a lowest amount possible such as a black, blank, or null frame could be a zero for an amount of vivid colors) and ten (e.g., a highest amount possible such as a rule of thirds having a frame having a number of pixels that are divided and grouped into three distinct and equal parts). The aesthetics engine 120 can determine, for each keyframe, a respective total aesthetic score (out of a maximum aesthetic score of 50) by summing each of the aesthetic scores for a particular keyframe.

In some examples, the aesthetics engine 120 can determine a set of total aesthetic scores using all of the frames within a particular video segment (e.g., a temporal or topical segment), a keyframe set (e.g., representations of major scenes), a keyframe subset (e.g., keyframes associated with major scenes having a minimum threshold aesthetic score), or any groupings of frames discussed herein. The aesthetics engine 120 can rank sets of total aesthetic scores by sorting these sets of total aesthetic scores by normalizing the values of the sets using the number of frames or keyframes within each set. In some examples, the keyframe selector 112 can select one or more keyframes, a keyframe set, a video segment, or a keyframe subset using a ranked set of total aesthetic scores provided by the aesthetics engine 120.

In some embodiments, the computation of the aesthetic score may use weights that are applied to various aesthetic parameters. The weights can be obtained from an aesthetic model that uses weighting factors associated with aesthetic parameters that indicate the relative importance of each aesthetic parameter. Continuing with the examples of the aesthetic parameters discussed above, an aesthetic model may prioritize the presence of vivid colors as a positive aesthetic parameter with a higher priority than a negative aesthetic parameter with of an amount of motion blur. In a simplified example, the aesthetics engine 120 may use a single threshold value for each of the amount of vivid colors and the amount of motion blur to determine a threshold level associated with a particular keyframe. For instance, a keyframe having a determined amount of vivid colors and amount of motion blur can be categorized by the aesthetics engine 120 as having an amount of the aesthetic parameter that is "high" or "low," respectively, using the threshold value. In some examples, the aesthetics engine 120 can categorize the amounts of any number of aesthetic parameters by applying numerical values that are associated with one or more threshold levels, for each respective aesthetic parameter.

In one example, a first keyframe may have a "high" amount of vivid colors and a "high" amount of motion blur, and a second keyframe may have a low amount of vivid colors and a low amount of motion blur. If the aesthetics engine 120 were to treat both aesthetic parameters as equal factors, then the positive aesthetic parameter indicating the amount of vivid colors would negate the negative aesthetic parameter indicating the amount of motion blur for both the first keyframe and the second keyframe. But an aesthetics engine 120 using weighted factors for aesthetic parameters (e.g., assigning a higher weight to vivid colors than to motion blur) could determine that the first keyframe should be ranked higher than the second keyframe by calculating a higher aesthetic score of the first keyframe, since the first keyframe has the aesthetic parameter (vivid colors) that is assigned the higher weighting factor.

In some examples, the aesthetics engine 120 applies a numerical weighting factor, associated with numerically assigned aesthetic parameters, to a set of aesthetic parameters in order to obtain a set of adjusted aesthetic parameters. The aesthetics engine 120 can use these adjusted aesthetic parameters to sort and rank a keyframe set according to an aesthetics model. The aesthetics engine 120 transmits, to the adaptive search engine 108, data that identifies or includes the keyframe set, their respective content tags, and their respective aesthetic score to the adaptive search engine 108.

Figure 2:
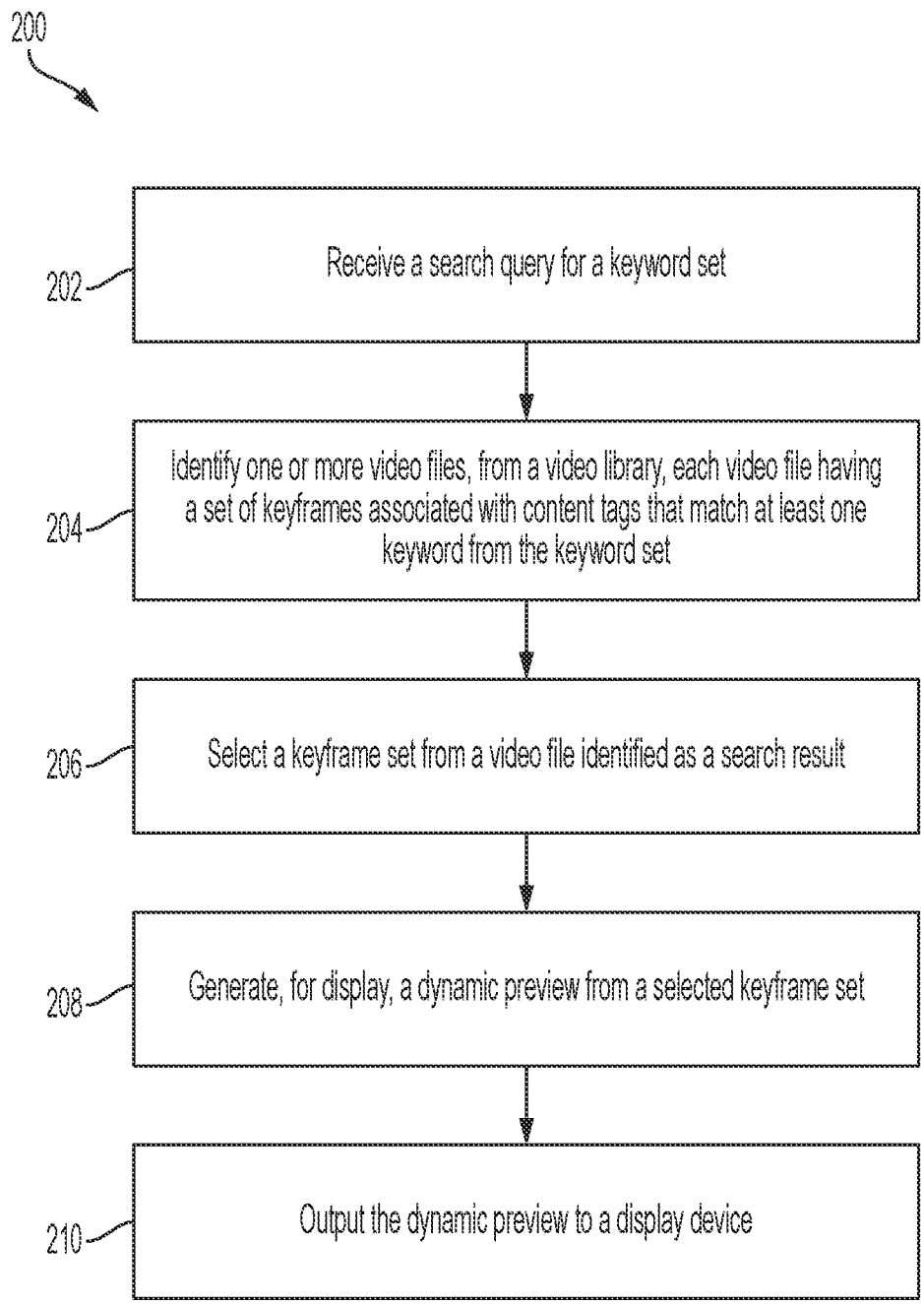
FIG. 2 depicts a process for generating adaptive search results for multimedia search queries, according to certain embodiments of the present disclosure.

Examples of a Process for Generating Adaptive Search Results for Multimedia Search Queries FIG. 2 depicts a process 200 for generating adaptive search results for multimedia search queries, according to certain embodiments of the present disclosure. In some embodiments, one or more processing devices implement operations depicted in FIG. 2 by executing suitable program code (e.g., keyword selection engine 110, keyframe selector 112, rendering engine 122, etc.). For illustrative purposes, the process 200 is described with reference to certain examples depicted in the figures. Other implementations, however, are possible.

At block 202, the process 200 involves receiving a search query that includes a keyword set. For example, the image processing system 114 can implement the block 202. The image processing system 114 can receive, during a session with a client device 106, the search query from the client device 106 via the data network 102. The image processing system 114 can identify a keyword set from the search query. In some embodiments, the keyword set includes one or more keywords provided by the client device 106. In additional or alternative embodiments, the keyword set includes variants of one or more keywords provided by the client device 106 (e.g., synonyms of a user-provided keyword, a root word of a user-provided keyword, etc.).

In some embodiments, the image processing system 114 can receive the search query directly from one or more client devices 106. In additional or alternative embodiments, the image processing system 114 can receive the search query from a third-party computing system, such one or more server systems that host a search engine (e.g., adaptive search engine 108) accessed by one or more client devices 106.

The image processing system 114 can service the search query and generate one or more dynamic previews for search results that match one or more search terms in the search query. Blocks 204-208 can implement a step for generating a dynamic preview of video content matching the keyword.

For example, at block 204, the process 200 involves identifying one or more video files, from a video library, each video file having a set of keyframes associated with content tags that match at least one keyword from the keyword set. For example, the image processing system 114 can execute the adaptive search engine 108 to implement block 204. The adaptive search engine 108 can access a set of video files and content tags associated with the video files. The adaptive search engine 108 can compare the content tags to the keyword set. If a particular video includes a content tag having a keyword from the keyword set, the adaptive search engine 108 identifies the video as a search result for the search query.

The adaptive search engine 108 can perform one or more suitable operations for obtaining a set of video files that is compared, at block 204, to the keyword set. In one example, the keyword search engine 110 could retrieve a catalogue of multimedia files and select video files from the catalogue. To do so, the keyword search engine 110 communicates with multimedia database 104 to determine whether content tags associated with a particular video file includes a sufficient number of content tags that match a keyword set in a search query received at block 202. For instance, video file metadata could include content tags identifying a title, description, classification or category, timestamp, location information, duration, file size, resolution, etc. The keyword search engine 110 can use the video file metadata to determine whether a number of matches between the keyword set and the video file's content exceeds a threshold. If so, the keyword search engine 110 selects the video file as a search result for the search query received at block 202.

In another example, the adaptive search engine 108 can compare the search query received at block 202 to one or more stored search queries. If the search query received at block 202 includes one or more search terms that match one or more search terms from a stored search query, the adaptive search engine 108 can identify a set of video files that were provided as search results in a response to the stored search query. The adaptive search engine 108 can compare content tags for the identified set of video files to the keyword set of the search query received at block 202. If a particular video that matches the search query received at block 202 was also included in the search results for stored search query, the keyword search engine 110 can weight that particular video file search result more heavily (i.e., cause the particular video file search result to be listed earlier in a list of search results) relative to a video file that only appears in search results for the search query received at block 202.

At block 206, the process 200 involves selecting a keyframe subset from a video identified as a search result, where the keyframe subset is a reduced set of keyframes previously selected using respective matching scores that indicate a number of matches between the keyword set and content tags of the selected keyframes. For example, the image processing system 114 can execute the keyframe selector 112 of the adaptive search engine 108 to implement block 206.

The keyframe selector 112 can compute matching scores for a keyframe set of a video that has been identified as a search result. The matching scores indicate a closeness of a match between a given keyframe and the search query. For instance, if most of the features in a particular keyframe are associated with content tags that include at least one keyword from the keyword set, the keyframe may have a higher matching score. Conversely, if a minority of the features in a keyframe are associated with content tags that include at least one keyword from the keyword set, the keyframe may have a lower matching score.

The keyframe selector 112 can rank the keyframe set in accordance with respective matching scores, as described above with respect to FIG. 1. In some embodiments, the keyframe selector 112 can rank the keyframe set in accordance with their matching scores in combination with additional parameters, such as aesthetic scores. The keyframe selector 112 stores a sorted list of the ranked keyframe set. As discussed above, in some embodiments, the keyframe selector 112 can determine a number of keyframes from the ranked keyframe set (e.g., a keyframe subset) to be included in a dynamic preview.

For instance, in embodiments in which the dynamic preview is a thumbnail collage, the keyframe selector 112 can determine a total number of keyframes to be included in the thumbnail collage. In one example, the keyframe selector 112 can determine a number of keyframes to include one or more user preferences. User preferences can include a time duration, a dynamic preview resolution, a video playback speed, a number of images to be included in a collage, a number of search results to be displayed simultaneously, an aspect ratio, an audio setting, a loop setting, a refresh rate, a caption preferences, an automatic playback, or any combination of these.

In one example, the keyframe selector 112 can access a user profile, that stores one or more user preferences, for a user that is associated with a client device 106 from which a search query is received. The user profile can include data indicating that search results are to be displayed as a thumbnail collage of n images. In this case, the keyframe selector 112 determines the highest ranking number of n keyframes to provide to a rendering engine 122 for a thumbnail collage. The user profile can also include a default value of n or a value of n that has been specified via one or more user inputs.

In another example, the keyframe selector 112 can determine a maximum number of keyframes to include, where the maximum number may override a user preference. For instance, a maximum value of n can be determined with parameters that may include one or more of a display capability of a client device 106 from which a search query is received, a display screen size of a client device 106 from which a search query is received, frame resolutions of videos matching a search query, etc. If the keyframe selector 112 has determined a maximum number of keyframes to include in a dynamic preview, the keyframe selector 112 could select a value of n that is the smaller of the determined maximum number of keyframes and the user-specified number of keyframes.

In these embodiments, the keyframe selector 112 can generate an on-hover preview in accordance with one or more user preferences. An on-hover preview can include playback of a video clip, a popup, a graphical display, an introductory video, a GIF, an advertisement, an animation, etc. In some examples, the keyframe selector 112 can generate an on-hover preview that includes one or more triggers. Examples of triggers can include a cursor movement, mousing, a mouseover, a mouse click, proximity sensing (e.g., a sensor for detecting a location that is proximate, nearby, or within a predefined distance between a cursor, pointer, a user's finger, stylus, etc. and an image representing the on-hover preview), or an interaction with a touch surface, a gesture, etc. For instance, a video player can begin playback of a video clip if a processor of a client device, in communication with a proximity sensor, receives a sensor signal indicating that an object (e.g., a user's finger) is approaching a graphical representation of an on-hover preview, then the processor can determine playback is being initiated by a trigger associated with the user interaction and begin playback of the on-hover preview.

In one example, the keyframe selector 112 can access a user profile for a user that is associated with a client device 106 from which a search query is received. The user profile can include data indicating a user preference for search results to be displayed using an on-hover preview video. In some examples, such a user preference for an on-hover preview can indicate that the on-hover preview video should have a user-specified duration parameter. Examples of user-specified duration parameter include a minimum time duration, a maximum time duration, a time duration falling within a specified a range of durations, etc.

In these embodiments, the keyframe selector 112 can transmit a command to a rendering engine 122 for rendering the on-hover preview video. The command can specify that each of the n highest-ranked keyframes are to be displayed in a specified sequence (i.e., by ordering the keyframes in accordance with their sequentially increasing timestamps). The command can also specify that each keyframe is to be assigned a particular display duration such that a total time duration of the on-hover preview video complies with the user-specified duration parameter.

At block 208, the process 200 involves generating, for display, a dynamic preview from a selected keyframe set. For example, the image processing system 114 can execute the rendering engine 122 to generate the dynamic preview. A dynamic preview includes an arrangement of the selected keyframe set. The selected keyframe set includes at least two keyframes selected by keyframe selector 112 at block 206. In some embodiments, the rendering engine 122 can generate a dynamic preview in accordance with a command from the keyframe selector 112 that identifies particular keyframes, a particular number of keyframes, a particular sequence of keyframes, etc. Examples of a dynamic preview, such as a thumbnail collage or an on-hover preview, are described in further detail below with respect to FIGS. 4, 5, 7, and 8.

At block 210, the process 200 involves outputting the dynamic preview to a display device. For example, the rendering engine 122 outputs the dynamic preview depicting the keyframe set to one or more client devices 106 to a storage device accessible to the image processing system 114. The image processing system 114 can retrieve the dynamic preview from the storage device and transmit the dynamic preview to a client device 106. The client device 106 can display the dynamic preview in a graphical interface that includes one or more search results for the search query. In some embodiments, the image processing system 114 can transmit the dynamic preview depicting the keyframe set directly to one or more client devices 106. In additional or alternative embodiments, the image processing system 114 can transmit the dynamic preview to a third-party computing system, such one or more server systems that host a search engine (e.g., adaptive search engine 108) accessed by the client device 106.

Figure 3:
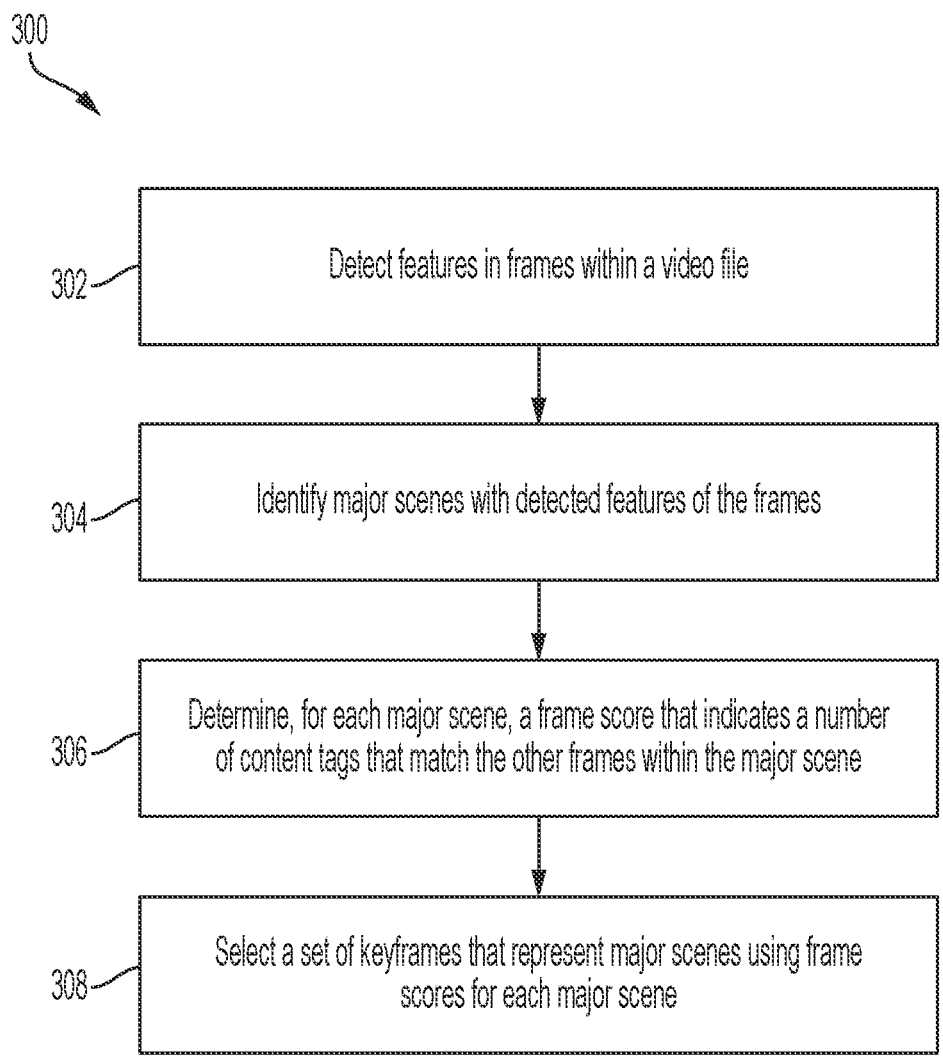
FIG. 3 depicts an example of a process for selecting at least two keyframes within a video file using content tags, according to certain embodiments of the present disclosure.

FIG. 3 depicts a process 300 for selecting one or more keyframes within a video file using content tags, according to certain embodiments of the present disclosure. The process 300 can be used to identify the keyframes used in block 206 of the process 200. In some embodiments, one or more processing devices implement operations depicted in FIG. 3 by executing suitable program code (e.g., keyframe detector 116, tag generator 118, etc.). For illustrative purposes, the process 300 is described with reference to certain examples depicted in the figures. Other implementations, however, are possible.

At block 302, the process 300 involves detecting features in frames of a video file. For example, the image processing system 114 can execute the keyframe detector 116 of the adaptive search engine 108 to implement the block 302. The keyframe detector 116 can scan content of a video identified as a search result and detect features within the video file.

In some embodiments, the image processing system 114 can create a reduced-resolution version of the video search result, thereby increasing processing efficiency for the scanning process. For example, the image processing system 114 can create a copy of the video search result, resize frames within the copied video (e.g., by transcoding a high-definition resolution, such as 1920×1080, to a reduced resolution, such as 512×288), and provide the resized frames to the keyframe detector 116 for scanning. In the scanning process, the keyframe detector 116 can divide the video file into segments by determining keyframes associated with major scenes within the video file. The keyframe detector 116 uses a suitable feature detector (e.g., ORB, FAST, BRIEF, etc.) to identify features of the frames that are used to determining which frames are keyframes of major scenes.

At block 304, the process 300 involves identifying major scenes in the video file with the detected features of the frames. For example, the keyframe detector 116 of can implement the block 304. To do so, the keyframe detector 116 creates video segments of frames for each major scene within the video file. The keyframe detector 116 compares the scanned features (e.g., regions, edges, key points, pixel values, feature vectors, etc.) of a current frame with matching features of an immediate previous frame in the sequence. The keyframe detector 116 groups the frames by sorting frames using a predetermined number of matching features between the frames. For instance, if a first video segment includes frames that share a first set of detected features and a second video segment includes frames that share a second set of detected features, a particular frame is assigned to the first video segment if that particular frame includes more features from the first set of detected features than the second set of detected features.

As an example, the keyframe detector 116 matches features of a previous frame with features of a current frame. The keyframe detector 116 determines whether a number of features matching the previous frame with respect to a threshold number of features. If the keyframe detector 116 determines that the number of matching features is less than the threshold number of features, then the keyframe detector 116 temporarily marks the current frame as a first frame of a new major scene. The keyframe detector 116 can then verify the beginning of the new major scene by determining whether the temporarily marked frame includes a number of matching features greater than the threshold number of features for a predetermined number of subsequent k frames. If the keyframe detector 116 determines the number of matching features is greater than the threshold number of features, then a current frame is included in a video segment of frames associated with the previous frame.

At block 306, the process 300 involves determining, for each major scene, a frame score that indicates a number of features that match the other frames within the respective major scene. The keyframe detector 116 determines a number of features, for each frame, that match features shared by other frames within the particular video segment, assigning a frame score for each frame within the video segment using the number of matching features.

The keyframe detector 116 can assign a frame score to each frame within a video segment utilizing a total number of matching features. The keyframe detector 116 can sort the frames within a video segment in a hierarchical order of their respective frame scores. In some embodiments, the keyframe detector 116 can sort the frames within a video segment based on a mean frame score.

In one example, the mean frame score can be determined using an average number of features common to frames within a particular video segment. For instance, a particular video segment contains a number of n frames, each frame having a predetermined threshold number of features in common that is required to be included in the video segment. The keyframe detector 116 can determine, using previously identified features associated with each frame, a total number of features f that is shared by the respective frame and the other frames. The keyframe detector 116 sums all of the features within the video segment (e.g., $\Sigma f_n$) and divides this sum by the number of frames n to obtain the mean frame score of the frames included in the video segment. The keyframe detector 116 may use the mean frame score as a minimum threshold value to include a particular frame in a subset of keyframes to send to the keyframe selector 112. The keyframe detector 116 can select, as one or more keyframes for the major scene, a set of frames with frame scores that meet a threshold criteria (e.g., one or more frames having the highest frame scores, one or more frames having frame scores above a threshold or mean frame score, etc.).

In some embodiments, the keyframe detector 116 communicates with the tag generator 118 to obtain additional content tags that the tag generator applies to keyframes of a video search result. As noted above, the adaptive search engine 108 can retrieve a video file having content tags matching a keyword set of a search query. But even though the video file includes content tags matching the keyword set, the content tags may not be associated with keyframes that depict content that is relevant to the search query. The adaptive search engine 108 can execute the keyframe detector 116 and the tag generator 118 to generate content tags that are associated with such keyframes, which can thereby facilitate the creation of a dynamic preview that includes the content that is relevant to the search query.

For instance, the tag generator 118 can receive, from the keyframe detector 116, data identifying keyframes for the video file. The tag generator 118 determines content tags associated with each keyframe as described above, with respect to FIG. 1. The tag generator 118 detects object boundaries and their associated content tags, labeling and mapping a relative location of each detected object within a keyframe. In one example, the tag generator 118 detects objects within each keyframe and generates content tags for the detected objects using deep learning techniques discussed above with respect to FIG. 1 (e.g., using Faster R-CNN with ResNet-101). In some examples, tag generator 118 sorts the keyframes using a limited set of criterion such as a maximum number of keywords, synonyms, or combination of keywords and synonyms associated with previous search queries provided by a user.

In additional or alternative embodiments, image processing system 114 can increase processing efficiencies by generating content tags for a reduced number of frames. For instance, image processing system 114 executing tag generator 118 after receiving a keyframe set reduces an amount of content tags that need to be generated to only include those representing major scene, as identified by the keyframe detector 116, instead of identifying content tags for every frame within a video file. In some examples, the image processing system 114 can execute tag generator 118 after the keyframe selector 112 determines a preliminary, reduced subset of candidate keyframes from a keyframe set (e.g., using threshold aesthetic scores to make such a determination, as discussed herein).

In some embodiments, the tag generator 118 can also increase the accuracy of content tags by using more than one deep learning technique to detect anomalous keyframes and select the anomalous keyframes. An anomalous keyframe can include detectable features, associated with the frame's spatial or temporal occurrence relative to spatially or temporally adjacent frames, at either the pixel level or frame level (e.g., new objects, shapes, edges, pixel values, a movement of an object, an unpredictable behavior associated with an object, etc.) that deviates significantly from a predicted pixel value or frame value. In some examples, a significant deviation from a predicted pixel value or frame value can be a deviation from an intra-frame or inter-frame prediction (e.g., using a codec such as JPEG, MPEG) that represents a statistical deviation greater than a predetermined standard deviation for a set of pixel values or frame values. For instance, the tag generator 118 may use a convolutional neural network to detect anomalous keyframes, extracting respective features pertinent to a particular keyframe, and identifying such features as being associated with a content tag.

In one example, the tag generator 118 can encode the extracted features into a representation of focal points in the particular keyframe. The focal points of a keyframe could include, for example, a region of interest, a particular object, person, face, group of proximately located objects within a region of an image, a centroid of an object in an image, etc. The encoded representation of focal points could include, for example, low-level visual components or high-level components, discussed above, which may be encoded (e.g., by an encoding model using a linear model, a non-linear model, a hierarchical model, a voxel representation model, a haystack model, or any other suitable computational model) to compress an amount of data associated with a tagged focal point.

In another example, the tag generator 118 can determine a cluster of related images associated with the encoded representation. For instance, a cluster of related images, such as images depicting statistically similar objects (e.g., an object with an insignificant amount of variance that is below a standard deviation for the identification of the object) occurring in one or more sets of sequential frames, could be associated with an encoded representation of focal points, such as a video segment depicting a monkey riding bicycle and another depicting a dog riding a bicycle. In this example, because the monkey and dog are semantically related (e.g., animals) and are riding statistically similar objects (e.g., bicycles) their respective video segments can be clustered together. The tag generator 118 can label the clustered images with one or more classifications. For instance, if the cluster of images depicting monkey and dog bicyclists are associated with the encoded representation of focal points such as a monkey, a dog, wheels, handlebars, pedals, etc., then the tag generator 118 can apply a content tag to the images indicating that the images can be classified as "animals cycling," "bike-riding mammals," or "pets on bicycles." The tag generator 118 can provide the content tags for these images to the keyframe selector 112.

At block 308, the process 300 involves selecting a set of keyframes that represent major scenes using frame scores for each major scene. The keyframe selector 112 can implement block 308. For example, the keyframe selector 112 can receive keyframes from the keyframe detector 116 or the tag generator 118. The keyframe selector 112 selects one or more keyframes from the received keyframes. In this example, a keyframe is selected if a ranking of the keyframe is sufficiently high (e.g., is one of the higher ranks, exceeds a threshold rank, etc.).

The ranking of the keyframe is determined from a match between a keyword set from a search query and a number of content tags for the keyframe. For instance, keyframe selector 112 determines, for each received keyframe, a keyframe weight taking into account a number of matches between the content tags associated with the particular keyframe and the queried keyword set. In additional or alternative embodiments, the keyframe selector 112 can use one or more content tags provided by the tag generator 118 to select one or more keyframes with a highest matching score relative to a predetermined set of criterion. In some examples, the keyframe selector 112 utilizes information provided by the keyword search engine 110, keyframe detector 116, tag generator 118, aesthetics engine 120, or any combination of information provided by these as criterion to determine a highest matching score. The keyframe selector 112 provides the matching scores to rendering engine 122.

Examples of Dynamic Previews Generated from Keyframes

Figure 4:
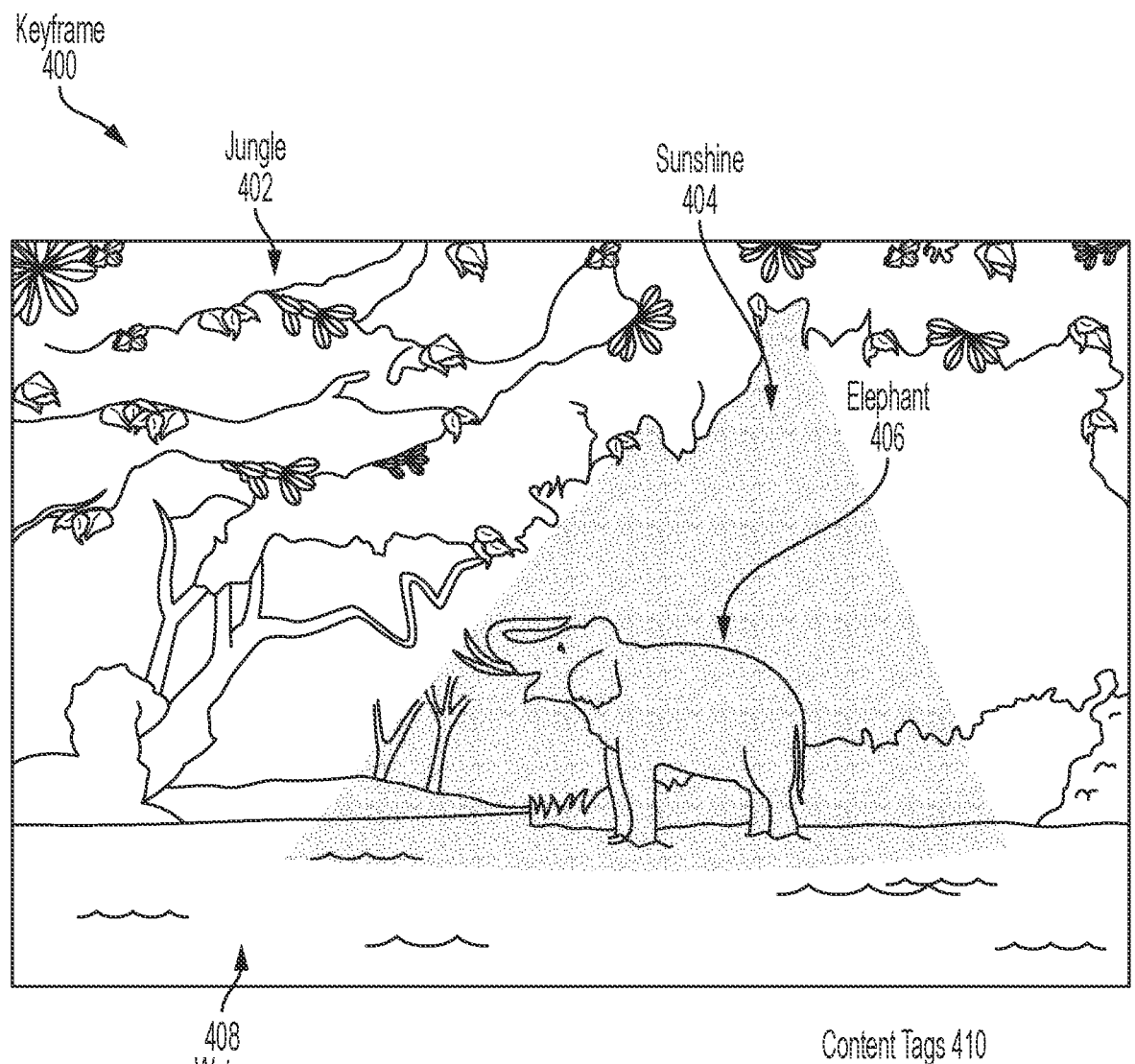
FIG. 4 depicts an example of a keyframe within a video file, selected using content tags, according to certain embodiments of the present disclosure.

The following examples are provided to illustrate potential applications of the operations described above. In particular, FIG. 4 depicts an example 400 of a keyframe within a video file, selected using content tags, according to certain embodiments of the present disclosure. In this example, a keyframe 400 represents an image within a video file identified by keyframe detector 116 according to certain aspects of embodiments discussed herein.

In the example depicted in FIG. 4, similar to block 204 of process 200, the image processing system 114 executes program code described herein (e.g., adaptive search engine 108, keyword search engine 110, keyframe detector 116, tag generator 118, etc.) to identify metadata associated with an image within a video frame (e.g., a creator, creation location, creation time, brand name, image title, one or more captions, keywords, technical details, digital rights, or any combination of these). In this example, the keyframe 400 depicts various features including jungle 402, sunshine 404, elephant 406, and water 408. In some embodiments, the tag generator 118 creates content tags 410 from a subset of the above-mentioned keyframe features.

For instance, content tag 412 identifies the feature jungle 402 as an element of the keyframe 400, which associated with classification term "Jungle." In some embodiments, content tag 412 can be classified with one or more additional classifications. For example, content tag 412 may include additional classifications such as a background image type, genre classifications of "wildlife," "forestation," or "vegetation," or a thematic classification "environmental scenery." Similarly, the remaining content tags 410 can also be associated with multiple content tags, classifications, or other contextual information discussed herein.

Continuing with the example keyframe 400, content tag 414 identifies the feature sunshine 404 that is likewise associated with classification term "Sunshine." Content tag 414 provide contextual information of the keyframe 400, such as identifying one or more features as "background," "lighting," "brightness," "nature," "sun," "star," etc. In addition, content tag 416, identifying elephant 406 as "Elephant," can also be classified with an image type "foreground imagery," a biological classification "animal kingdom," one or more geolocation classifications of "African savannah," "Southeast Asia," or "zoo," or a movie genre "children's movie character." Content tag 418 identifies feature water 408 as "Water," but can be classified in broad or narrow classifications. For instance, classifications such as "background" or "body of water" may be too broad to be helpful in selecting a keyframe, but image processing system 114 may have predetermined classifications that are narrower such as "standing water," "knee-deep," "shallow waters," etc. In some embodiments, multiple synonyms, classifications, or themes may be included in a content tag.

In other examples, multiple content tags may be created and associated with each object identified by tag generator 118.

Figure 5:
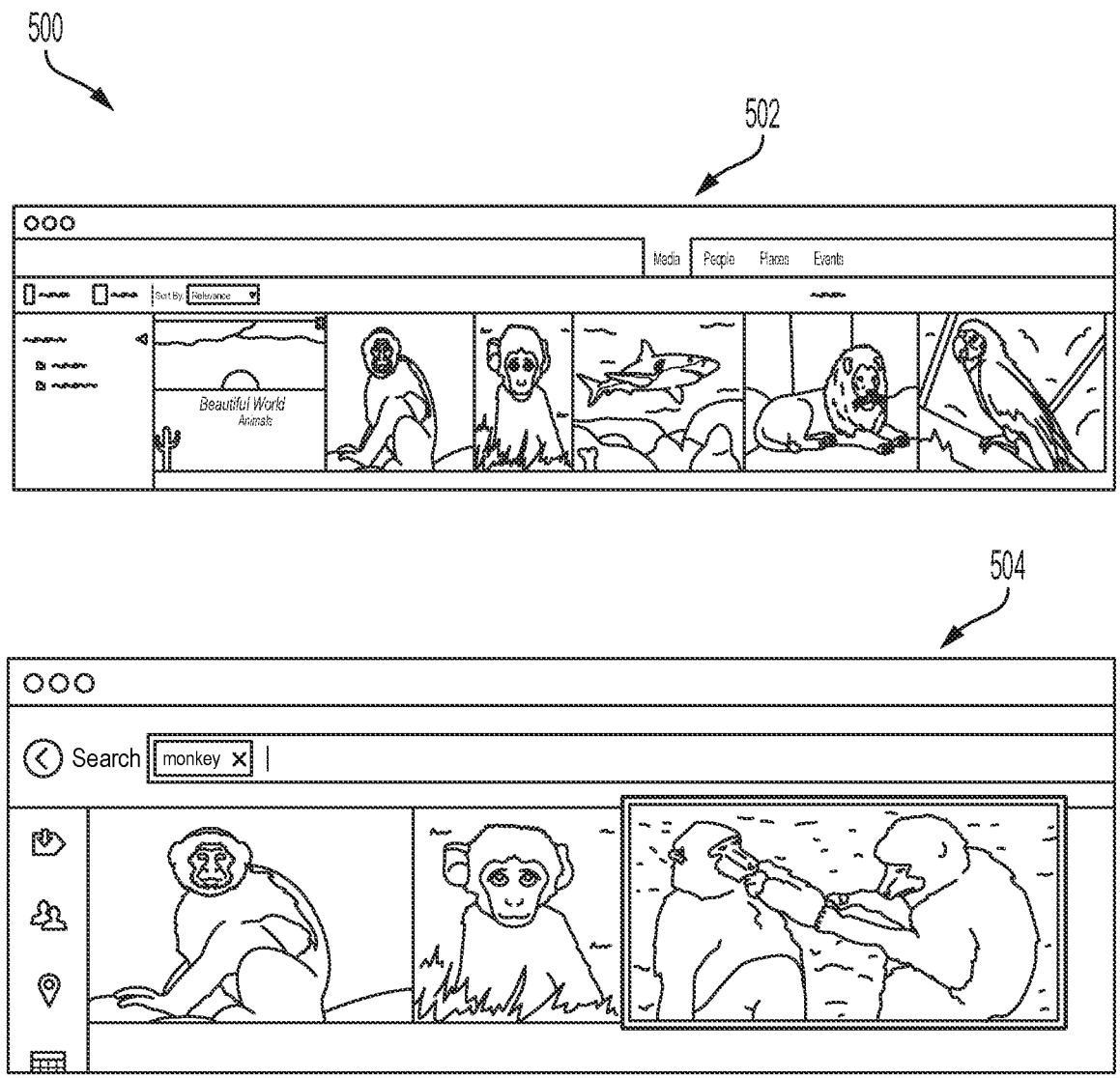
FIG. 5 depicts an example of generating, for display, a dynamic preview of at least two keyframes, according to certain embodiments of the present disclosure.

FIG. 5 depicts an example 500 of generating, for display, a dynamic preview of at least two keyframes. Thus, the functions described in this example can be applied to implement the block 208 in the process of FIG. 2. For instance, in the example 500 a user selects an option to perform a multimedia search 502 that is sorted by relevance. The user inputs a search query of "monkey," which generates, for display, the dynamic preview depicted in search result 504. In this example, three thumbnail images are selected for the collage depicted in the search result 504, and the rightmost third image, depicting primates interacting, represents an extracted keyframe that was not one of the initially display images present in the user selection from multimedia search 502.

Figure 6:
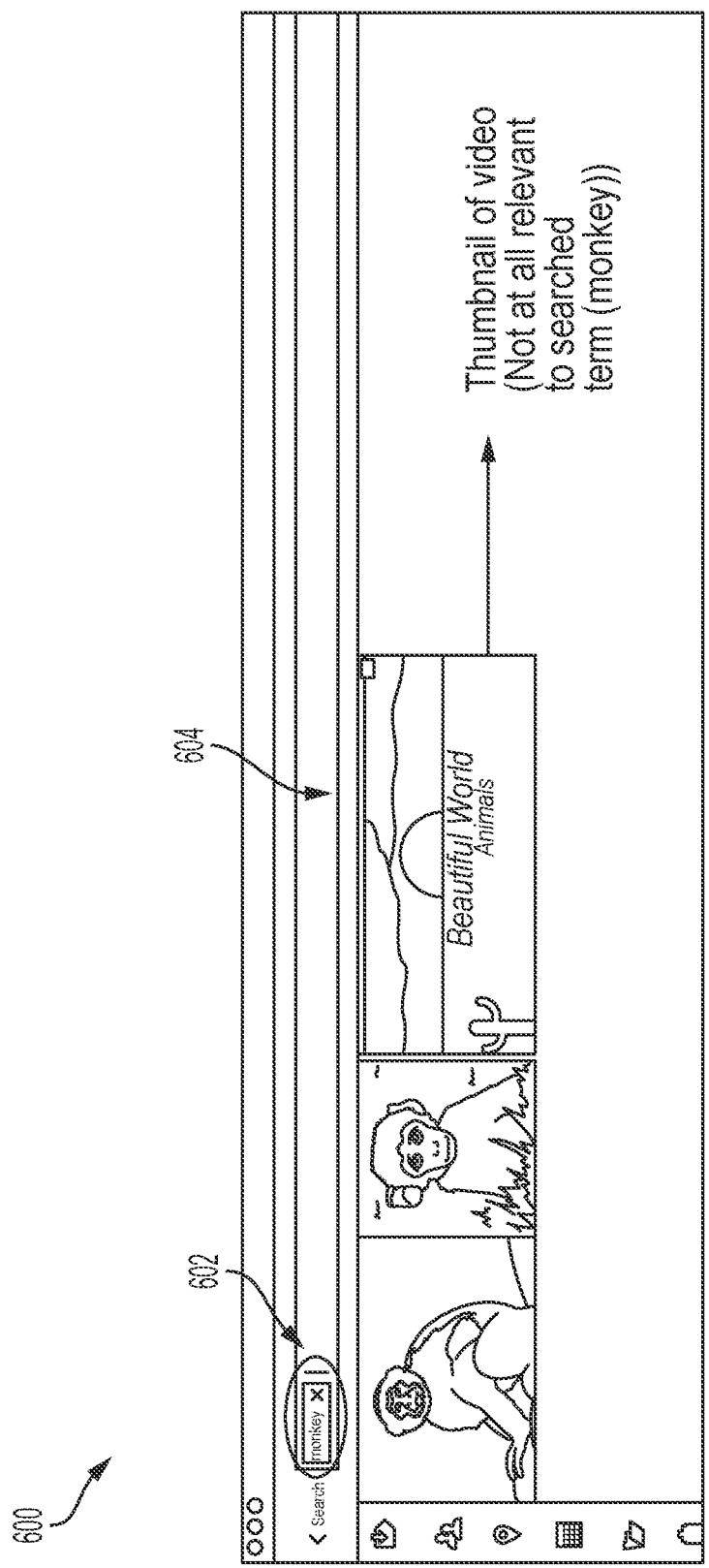
FIG. 6 depicts an example of a prior art search result.

FIG. 6 depicts an example 600 of a prior art search result. In this example, a user inputs a search query 602 for the keyword "monkey." However, unlike the dynamic previews for adaptive search results described herein, the search results include an image 604 of a rightmost thumbnail image that depicts a video title set against a background of a desert landscape is apparently unrelated to the keyword "monkey." In this example, the user would have little to no contextual information to decide whether the video corresponding to the image 604 is at all related to the keyword "monkey."

Figure 7:
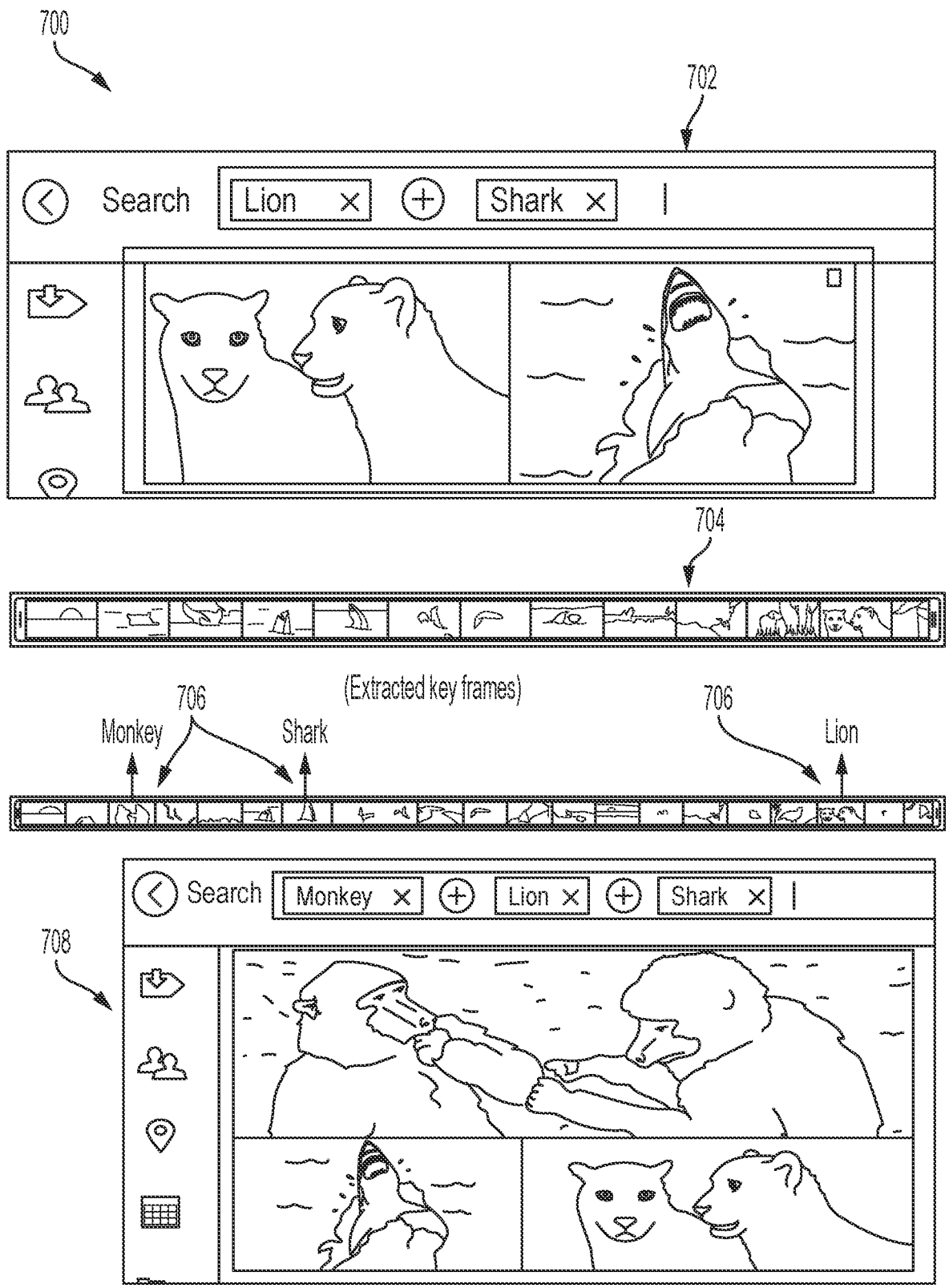
FIG. 7 depicts another example of generating, for display, a dynamic preview of at least two keyframes, according to certain embodiments of the present disclosure.

FIG. 7 depicts another example 700 of generating, for display, a dynamic preview of at least two keyframes, according to certain embodiments of the present disclosure. In this example, a user inputs a search query 702 of two keywords: "lion" and "shark," which can initiate a process 200 of FIG. 2, causing the image processing system 114 to identify a video file 704 according to the techniques described herein. In this example, the keyframe detector 116 identifies major scenes within the video file 704, extracting keyframes that are associated with relevant content tags. The keyframe selector 112 selects keyframe set 706 associated with keywords "monkey," "shark," and "lion," using their respective matching scores between the keyword set input by the user, e.g., "lion" and "shark," in combination with a recent, previous search query of "monkey."

In this example, keyframe selector 112 sends the selected keyframe set 706 to rendering engine 122, which generates for display the dynamic preview depicted in search result 708. In some embodiments, the three thumbnail images depicted in search result 708 are selected for the collage in an order that reflects a user history of search queries (e.g., "monkey" is displayed in an uppermost location since its corresponding search query preceded the query for "lion" and "shark"). And in some embodiments, the exemplary three thumbnail images depicted in search result 708 may be a default system setting that enables the system to limit inclusion of thumbnail images to a maximum number of thumbnail images for a given collage image.

Figure 8:
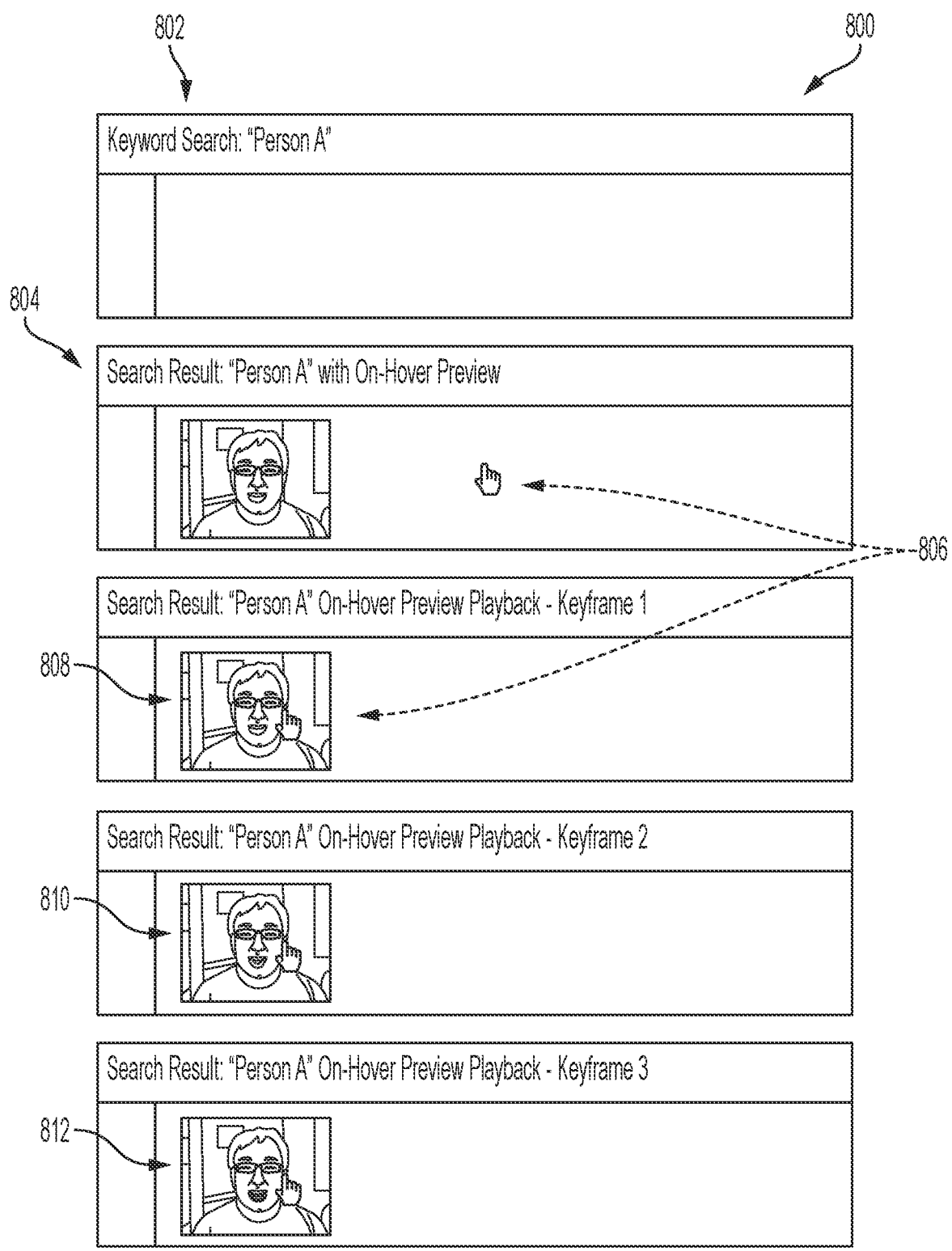
FIG. 8 depicts another example of generating, for display, a dynamic preview generated from at least two keyframes, according to certain embodiments of the present disclosure.

FIG. 8 depicts another example 800 of generating, for display, a dynamic preview of at least two keyframes, according to certain embodiments of the present disclosure. In this example, a user search query is input to determine a dynamic preview for adaptive search results according to certain aspects of embodiments discussed herein. In the example 800 depicted in FIG. 8, similar to block 202 of process 200, the image processing system 114 receives a search query 802 from the user for the keywords "Person A." As discussed above, with respect to blocks 204 and 206 of process 200, as well as the process 300, the adaptive search engine 108 identifies a video file using the keyword set, identifies keyframes within the video file with a threshold number of matching content tags, and determines a matching score for each keyframe by summing a number of matching content tags and the keywords. In example 800, the rendering engine 122 generates, for display, a dynamic preview similar to block 208 of process 200.

In this example, the dynamic preview produced by rendering engine 122 is an on-hover preview video with three keyframes. Specifically, the search result 804 depicts an arrangement of the dynamic preview that initially displays a first image 808. The first image 808 corresponds to keyframe 1 of the on-hover preview video generated by the rendering engine 122. A user can move cursor 806 to hover over (e.g., mouseover) the first image 808 depicted in search result 804. The movement of the cursor 806 to a corresponding on-screen location associated with the first image 808 initiates playback of the dynamic preview. In this example, playback of the on-hover preview video results in the subsequent display of a second image 810, corresponding to keyframe 2, and third image 812, corresponding to keyframe 3. In some embodiments, the playback of an on-hover preview can include playback of a looped video clip (e.g., a playback loop), a short video clip, an introductory video, a GIF, an advertisement, a series of graphics or still images (e.g., JPEG), an MPEG, an animation, a PNG, an MNG or any other suitable video format.

Figure 9:
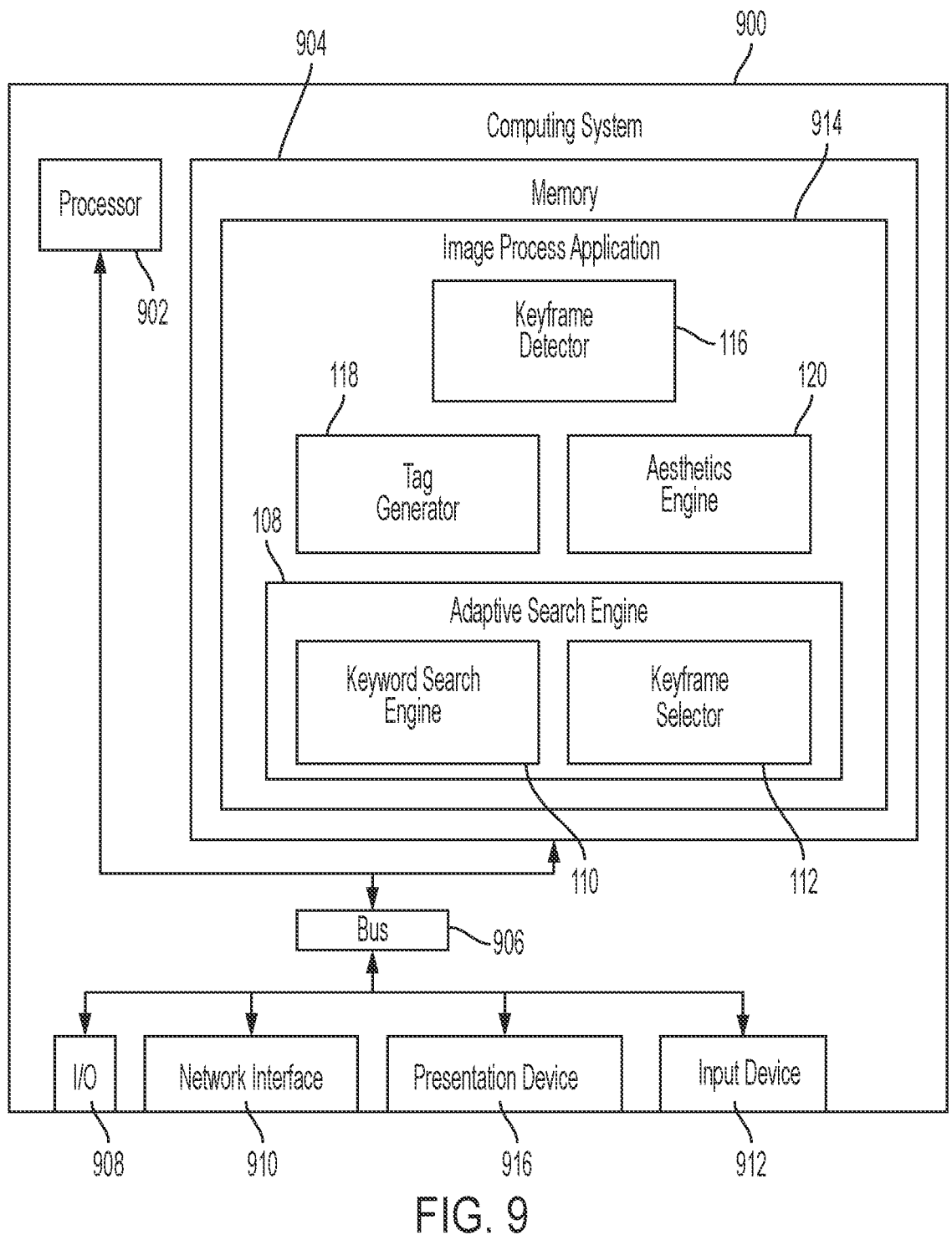
FIG. 9 depicts an example of a computing system that can perform certain operations described herein, according to certain embodiments of the present disclosure.

Example of a Computing System for Generating Adaptive Search Results for Multimedia Search Queries Any suitable computing system or group of computing systems can be used for performing the operations described herein. For example, FIG. 9 depicts examples of computing system 900 that executes an image processing application 914. In some embodiments, the computing system 900 also executes the adaptive search engine 108, as depicted in FIG. 9. In other embodiments, a separate computing system having devices similar to those depicted in FIG. 9 (e.g., a processor, a memory, etc.) executes the adaptive search engine 108.

The depicted examples of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, OpenCV, C, C++, C#, Visual Basic, Java, Python, Perl, JavaScript, and ActionScript.

The computing system 900 may also include a number of external or internal devices, such as an input device 912, a presentation device 916, or other input or output devices. For example, the computing system 900 is shown with one or more input/output ("I/O") interfaces 908. An I/O interface 908 can receive input from input devices or provide output to output devices. One or more buses 906 are also included in the computing system 900. The bus 906 communicatively couples one or more components of a respective one of the computing system 900.

The computing system 900 executes program code that configures the processor 902 to perform one or more of the operations described herein. The program code includes, for example, the image processing application 914, the adaptive search engine 108, or other suitable applications that perform one or more operations described herein. The program code may be resident in the memory device 904 or any suitable computer-readable medium and may be executed by the processor 902 or any other suitable processor. In some embodiments, all modules in the image processing application 914 (e.g., the keyframe detector 116, tag generator 118, aesthetics engine 120, keyword search engine 110, keyframe selector 112, etc.) are stored in the memory device 904, as depicted in FIG. 9. In additional or alternative embodiments, one or more of the image processing application 914 and the adaptive search engine 108 are stored in different memory devices of different computing systems. In additional or alternative embodiments, the program code described above is stored in one or more other memory devices accessible via a data network.

The computing system 900 can access one or more of the image processing application 914 and the adaptive search engine 108 in any suitable manner. In some embodiments, some or all of one or more of these data sets, models, and functions are stored in the memory device 904, as in the example depicted in FIG. 9. For example, a computing system 900 that executes the image processing application 914 can provide access to the keyword search engine 110 by external systems that execute the adaptive search engine 108.

In additional or alternative embodiments, one or more of these data sets, models, and functions are stored in the same memory device (e.g., one of the memory device 904). For example, a common computing system, such as multimedia database 104 depicted in FIG. 1, can host the adaptive search engine 108. In additional or alternative embodiments, one or more of the programs, data sets, models, and functions described herein are stored in one or more other memory devices accessible via a data network.

The computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and the like. The computing system 900 is able to communicate with one or more other computing devices (e.g., a computing device executing a keyframe selector 112) via a data network with the network interface device 910.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more computing devices, comprising:
    identifying a video comprising frames, the frames associated with content tags;
    detecting features for each frame of the video;
    identifying, based on the detected features for each frame of the video, scenes of the video;
    determining, for each frame for each scene of the identified scenes of the video, a frame score that indicates a number of content tags in the respective frame of the respective scene that match content tags associated with the other frames within the respective scene;
    determining, for each scene of the identified scenes of the video, a mean frame score based on a total number of content tags within the frames of the respective scene divided by a total number of the frames of the respective scene;

selecting, for each scene of the identified scenes of the video, a subset of frames of the respective scene based on the determined frame scores, wherein each frame of the selected subset of frames has a determined frame score that is greater than the mean frame score;

receiving a search query comprising a keyword; and generating, for display, search results responsive to the search query, the search results including a dynamic preview of the video, wherein the dynamic preview comprises an arrangement of frames of the video, each frame of the arrangement of frames corresponding to a respective identified scene of the identified scenes of the video, wherein each frame of the arrangement of frames is selected from the selected subset of frames.

2. The method of claim 1, further comprising:

extracting content attributes from each frame of the video frames; and generating, for each frame of the video, the content tags based on the respective content attributes.

3. The method of claim 1, wherein the dynamic preview comprises a video clip, the method further comprising:

displaying, responsive to the search query, a search result comprising the dynamic preview;

detecting a user input comprising a location within a predefined distance of the dynamic preview; and playing back the video clip in response to the user input.

4. The method of claim 1, wherein generating the search results comprising the dynamic preview comprises:

identifying a time duration from a user profile; and combining the arrangement of frames into a video clip having the time duration.

5. The method of claim 1, wherein the dynamic preview comprises a collage, a GIF, or a playback loop.

6. The method of claim 1, further comprising:

determining, for each frame of the video, an aesthetic score; and wherein the arrangement of frames is based in part on the aesthetic scores of each of the arrangement of frames.

7. The method of claim 6, wherein the aesthetic score comprises a parameter indicating one or more of a quality, a balancing, a harmony, a sharpness, a lighting, or a symmetry.

8. The method of claim 6, wherein generating, for display, the dynamic preview comprises:

computing a respective total aesthetic score for each scene of the video, wherein the total aesthetic score comprising a sum of the aesthetic scores for a subset of frames within the scene, wherein selecting the subset of frames is based in part on the subset of frames being included in respective scenes having greater total aesthetic scores than other scenes of the video.

9. The method of claim 1, wherein each frame of the arrangement of frames respectively comprise a timestamp, and wherein generating, for display, the dynamic preview comprises:

determining an order of the subset of frames based on a chronological order of the timestamps; and arranging the subset of frames based at least in part on the chronological order.

10. A system comprising a processing device; and a non-transitory computer-readable medium communicatively coupled to the processing device and storing program code, wherein the processing device is configured for executing the program code and thereby performing operations comprising:

identifying a video comprising frames, the frames associated with content tags;

detecting features for each frame of the video;

identifying, based on the detected features for each frame of the video, scenes of the video;

determining, for each frame for each scene of the identified scenes of the video, a frame score that indicates a number of content tags in the respective frame of the respective scene that match content tags associated with the other frames within the respective scene;

determining, for each scene of the identified scenes of the video, a mean frame score based on a total number of content tags within the frames of the respective scene divided by a total number of the frames of the respective scene;

selecting, for each scene of the identified scenes of the video, a subset of frames of the respective scene based on the determined frame scores, wherein each frame of the selected subset of frames has a determined frame score that is greater than the mean frame score;

receiving a search query comprising a keyword; and generating, for display, search results responsive to the search query, the search results including a dynamic preview of the video, wherein the dynamic preview comprises an arrangement of frames of the video, each frame of the arrangement of frames corresponding to a respective identified scene of the identified scenes of the video, wherein each frame of the arrangement of frames is selected from the selected subset of frames.

11. The system of claim 10, the operations further comprising:

extracting content attributes from each frame of the video; and generating, for each frame of the video, the content tags based on the respective content attributes.

12. The system of claim 10, wherein the dynamic preview comprises a video clip, the operations further comprising:

displaying, responsive to the search query, a search result comprising the dynamic preview;

detecting a user input comprising a location within a predefined distance of the dynamic preview; and playing back the video clip in response to the user input.

13. The system of claim 10, wherein generating the search results comprising the dynamic preview comprises:

identifying a time duration from a user profile; and combining the arrangement of frames into a video clip having the time duration.

14. The system of claim 10, wherein the dynamic preview comprises a collage, a GIF, or a playback loop.

15. The system of claim 10, the operations further comprising:

determining, for each frame of the video, an aesthetic score; and wherein the arrangement of frames is based in part on the aesthetic scores of each frame of the arrangement of frames.

16. The system of claim 15, wherein the aesthetic score comprises a parameter indicating one or more of a quality, a balancing, a harmony, a sharpness, a lighting, or a symmetry.

17. The system of claim 15, wherein generating, for display, the dynamic preview comprises:
  computing a respective total aesthetic score for each scene of the video, wherein the total aesthetic score comprising a sum of the aesthetic scores for a subset of frames within the scene,
  wherein selecting the subset of frames is based in part on the subset of frames being included in respective scenes having greater total aesthetic scores than other scenes of the video.

18. The system of claim 10, wherein each frame of the arrangement of frames respectively comprise a timestamp, and wherein generating, for display, the dynamic preview comprises:
  determining an order of the subset of frames based on a chronological order of the timestamps; and
  arranging the subset of frames based at least in part on the chronological order.

19. A non-transitory computer-readable medium having program code stored thereon, wherein the program code, when executed by one or more processing devices, performs operations comprising:
  identifying a video comprising frames, the frames associated with content tags;
  detecting features for each frame of the video;
  identifying, based on the detected features for each frame of the video, scenes of the video;
  determining, for each frame for each scene of the identified scenes of the video, a frame score that indicates a number of content tags in the respective frame of the respective scene that match content tags associated with the other frames within the respective scene;
  determining, for each scene of the identified scenes of the video, a mean frame score based on a total number of content tags within the frames of the respective scene divided by a total number of the frames of the respective scene;
  selecting, for each scene of the identified scenes of the video, a subset of frames of the respective scene based on the determined frame scores, wherein each frame of the selected subset of frames has a determined frame score that is greater than the mean frame score;
  receiving a search query comprising a keyword; and
  generating, for display, search results responsive to the search query, the search results including a dynamic preview of the video, wherein the dynamic preview comprises an arrangement of frames of the video, each frame of the arrangement of frames corresponding to a respective identified scene of the identified scenes of the video, wherein each frame of the arrangement of frames is selected from the selected subset of frames.

* * * * *